United States Patent
Cho et al.

(10) Patent No.: US 8,659,574 B2
(45) Date of Patent: Feb. 25, 2014

(54) BENDING THRESHOLD AND RELEASE FOR A FLEXIBLE DISPLAY DEVICE

(71) Applicant: LG Electronics Inc., Seoul (KR)

(72) Inventors: Eunhyung Cho, Seoul (KR); Howon Son, Seoul (KR); Dami Choe, Seoul (KR); Seokbok Jang, Seoul (KR); Jeonghwa Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/013,229

(22) Filed: Aug. 29, 2013

(65) Prior Publication Data

US 2014/0002401 A1 Jan. 2, 2014

Related U.S. Application Data

(63) Continuation of application No. 13/407,791, filed on Feb. 29, 2012.

(60) Provisional application No. 61/581,646, filed on Dec. 30, 2011.

(51) Int. Cl.
*G06F 3/041* (2006.01)
*G06F 3/033* (2013.01)
*G09G 5/00* (2006.01)

(52) U.S. Cl.
USPC .......................................... 345/173; 345/184

(58) Field of Classification Search
USPC ................................................... 345/173
See application file for complete search history.

(56) References Cited

U.S. PATENT DOCUMENTS

2004/0008191 A1* 1/2004 Poupyrev et al. ............. 345/184

* cited by examiner

*Primary Examiner* — Charles V Hicks
(74) *Attorney, Agent, or Firm* — Birch, Stewart, Kolasch & Birch, LLP

(57) ABSTRACT

A flexible display device and a method for accurately recognizing a user's flex input bending of the flexible display device is described. The present invention is able to discard unintentional flexing of the flexible display device while being able to accurately recognize a user's intended flex input command based on a number of bending degree thresholds. A first bending threshold must be overcome in order to initially recognize a user's flex input as a valid flex input command. Then the user's flex input must fall below a second bending threshold in order to cease the recognition of the user's flex input as a valid flex input.

28 Claims, 10 Drawing Sheets

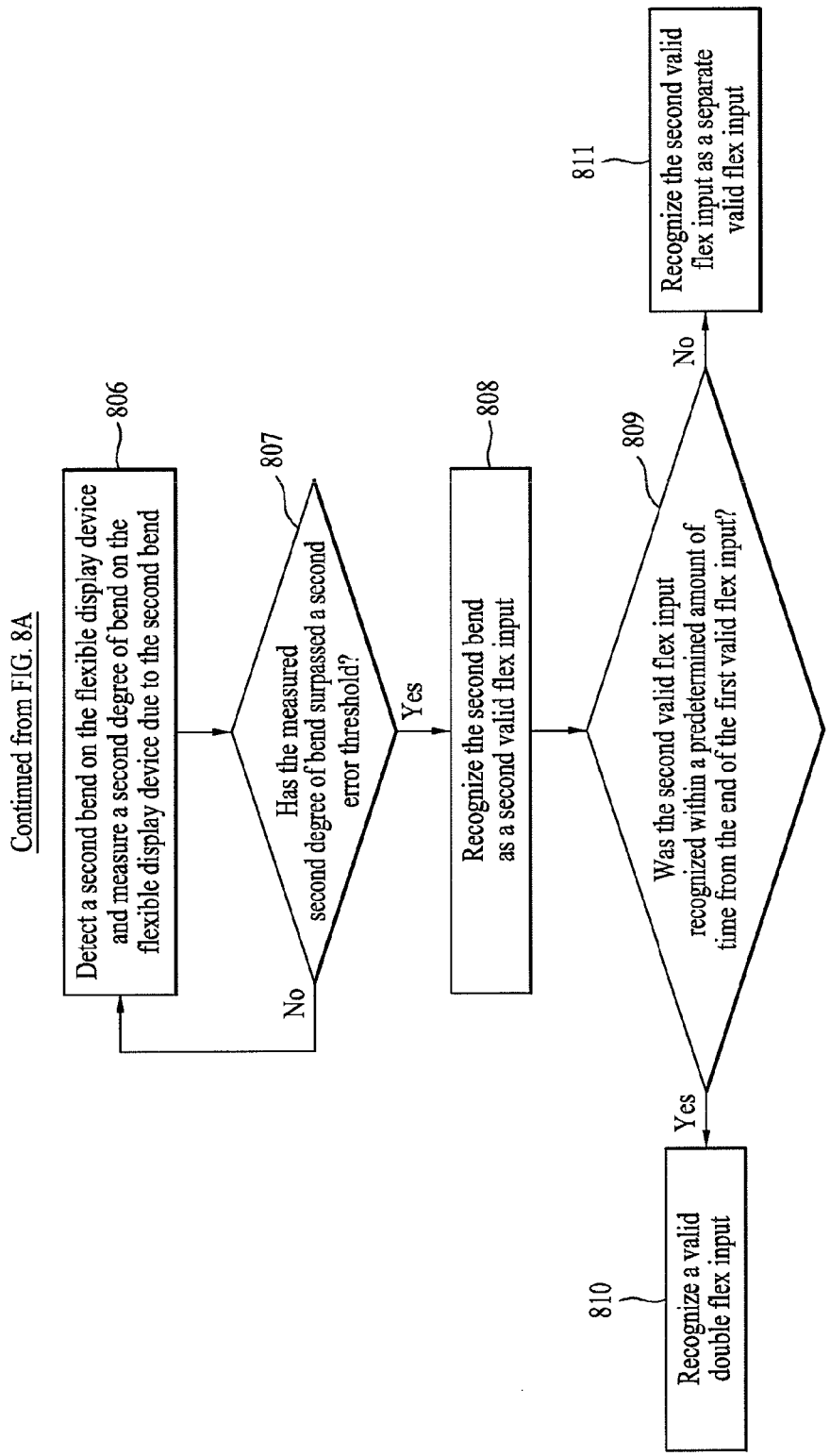

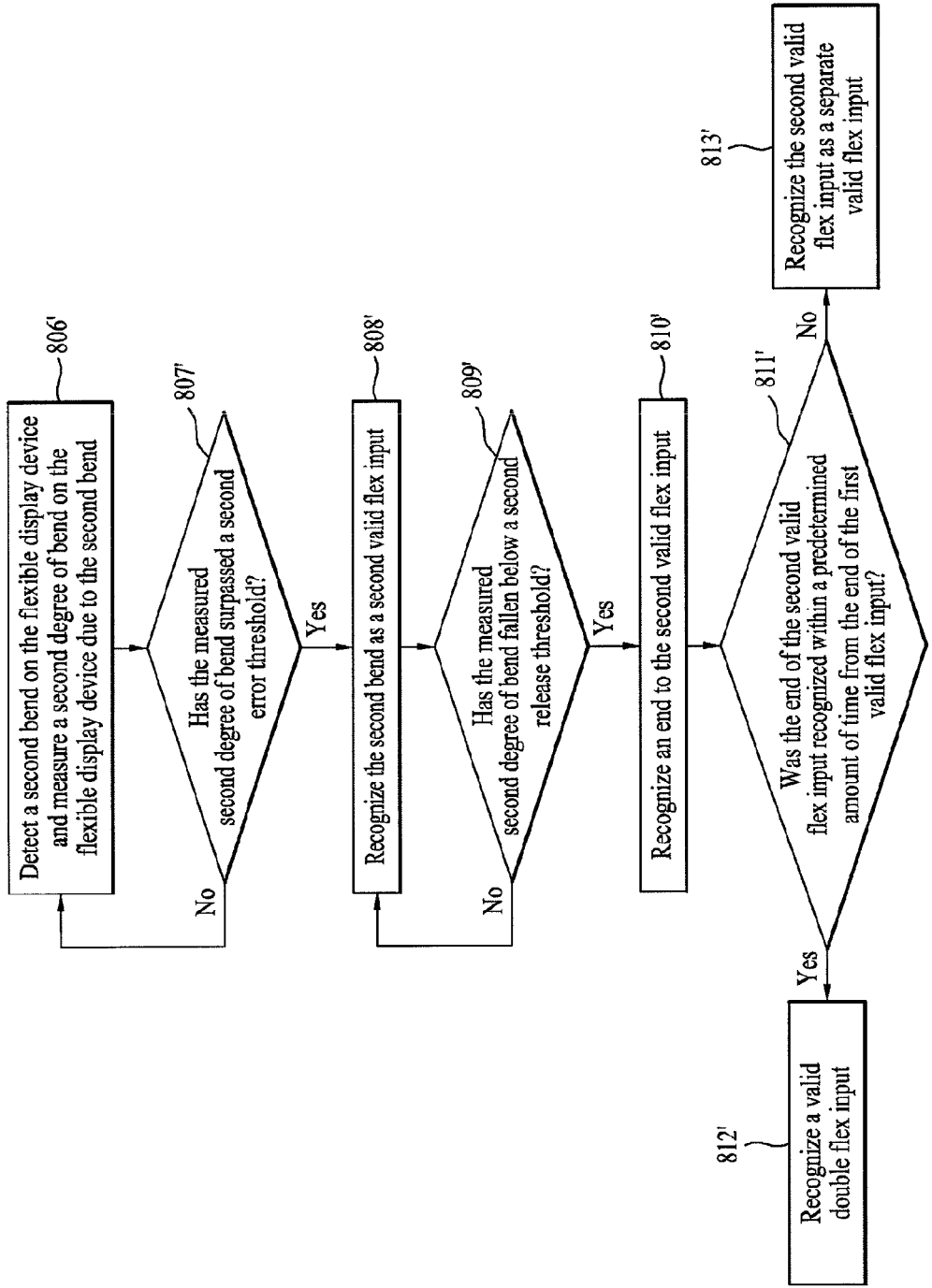

BENDING THRESHOLD AND RELEASE FOR A FLEXIBLE DISPLAY DEVICE

CROSS-REFERENCE TO RELATED APPLICATIONS

The present application is a 37 C.F.R. §1.53(b) continuation of U.S. patent application Ser. No. 13/407,791 filed Feb. 29, 2012, which claims the benefit of U.S. Provisional Application No. 61/581,646 filed on Dec. 30, 2011, the entire contents of all which are hereby incorporated by reference and for which priority is claimed under 35 U.S.C. §120.

BACKGROUND OF THE INVENTION

With the continued advancements in mobile device technology, mobile devices are able to offer greater processing power and capabilities. For instance, smart phone type mobile devices allow a user to connect to the internet, check emails, shop online, receive news updates in real-time, look up real-time traffic conditions and generally connect to other users throughout the world. As a result of the increased capabilities of mobile devices, these mobile devices are becoming an integral part of a person's everyday life.

Following the introduction of touch sensitive display screens on mobile devices, users have come to experience a whole new way of interacting with their mobile device. Whereas prior to the introduction of touch sensitive display screens a user was limited to interacting with their mobile device solely though hard wired buttons, with the introduction of touch sensitive display screens users are able to directly interact with objects displayed on the display screen. The user experience of having a touch sensitive display screen is vastly popular amongst consumers, and some may even consider such technology to be a must have option for any mobile device they are to buy. So more and more, consumers are looking for the latest technology that can provide a new and exciting user experience.

SUMMARY OF THE INVENTION

Accordingly, the present invention is directed to a flexible display device that allows a user to interact with the flexible display device by physically bending the body of the flexible display device. Each bending input made by a user may be recognized by the flexible display device as a specific command for controlling a feature of the flexible display device. By allowing a user to input commands on the flexible display device by physically deforming the body of the flexible display device, the present invention offers a new and unique user experience not offered by non-deformable display devices.

Now in order for the flexible display device to accurately recognize a user's bending of the body as a valid input command, the flexible display device must be able to distinguish unintentional bends on the body from intentional bends by the user. It is therefore an object of the present invention to provide a solution for distinguishing unintentional bends on the body of a flexible display device from intentional bends on the body of a flexible display device.

It is further an object of the present invention to provide a solution for accurately identifying a starting point for an intentional bending command input and an ending point for an intentional bending command input. By offering the following solutions described throughout this description the present invention is able to substantially resolve the limitations and deficiencies of the related art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8B illustrates a flowchart describing the steps of recognizing a double flex input, according to some embodiments of the present invention;

FIG. 8C illustrates a flowchart describing the steps of recognizing a double flex input, according to some embodiments of the present invention.

DETAILED DESCRIPTION OF THE INVENTION

Reference will now be made in detail to exemplary embodiments of the present invention, examples of which are illustrated in the accompanying drawings. It will be apparent to one of ordinary skill in the art that in certain instances of the following description, the present invention is described without the specific details of conventional details in order to avoid unnecessarily distracting from the present invention. Wherever possible, like reference designations will be used throughout the drawings to refer to the same or similar parts. It is noted that throughout the description, any use of "flex" and "bend" will be used interchangeably to generally describe a flex or bend in a flexible display device of the present invention.

Figure 1:
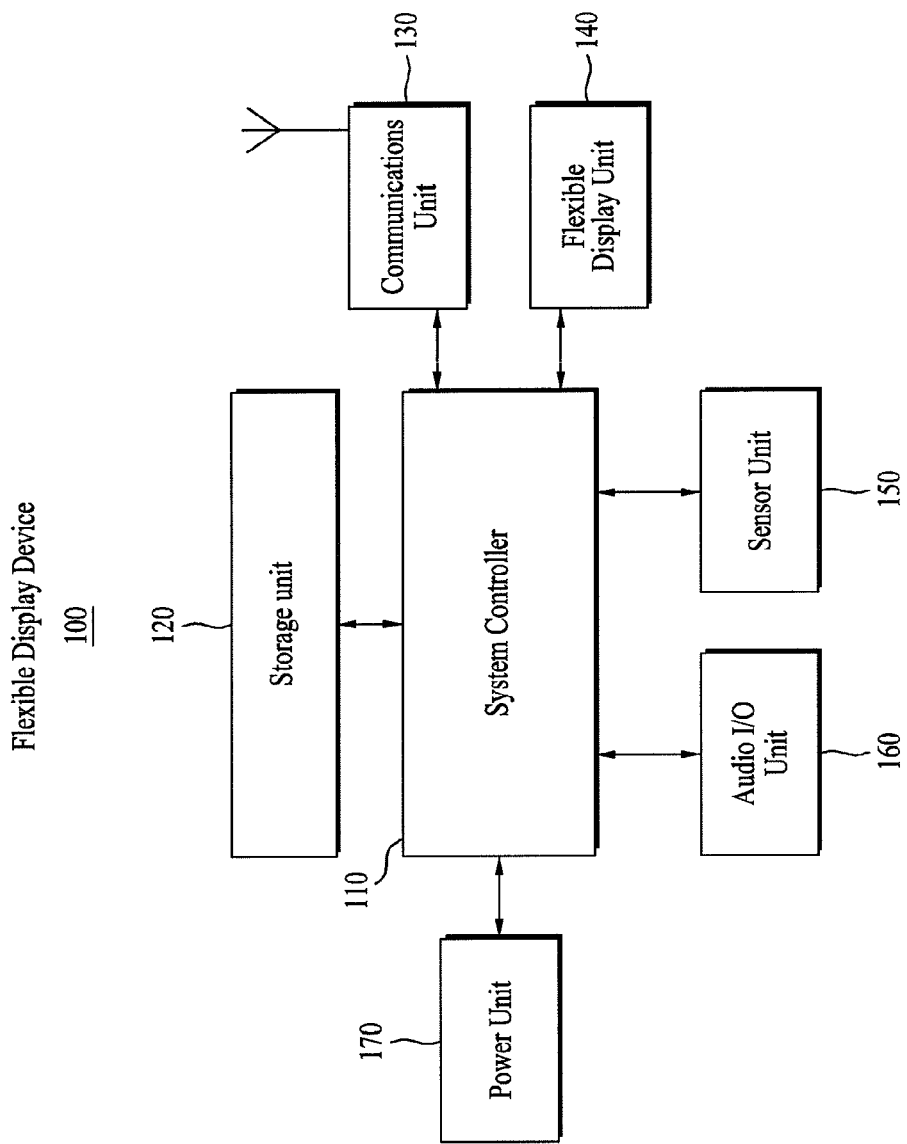
FIG. 1 illustrates a block diagram describing components of a flexible display device, according to the present invention.

FIG. 1 illustrates a general architecture block diagram for a flexible display device 100 according to some embodiments of the present invention. The flexible display device 100 illustrated in FIG. 1 may, for example, be a mobile telecommunications device, notebook computer, tablet computing device or personal digital assistant (PDA). It is to be appreciated that it is within the scope of the present invention to utilize flexible display devices that may include a fewer, or greater, number of components than what is expressly illustrated in FIG. 1.

As illustrated in FIG. 1, the flexible display device 100 includes a system controller 110, a storage unit 120, a communications unit 130, a flexible display unit 140, a sensor unit 150, an audio input output (I/O) unit 160 and a power unit 170. Although not all specifically illustrated in FIG. 1, components of the flexible display device 100 are able to communicate with each other via one or more communication buses or signal lines. It should be appreciated that the components of the flexible display device 100 may be implemented as hardware, software, or a combination of both hardware and software.

The storage unit 120 may include non-volatile type memory such as non-volatile random-access memory (NVRAM) or electrically erasable programmable read-only memory (EEPROM), commonly referred to as flash memory. The storage unit 120 may also include other forms of high speed random access memory such as dynamic random-access memory (DRAM) and static random-access memory (SRAM), or may include a magnetic hard disk drive (HDD). In cases where the flexible display device is a mobile device, the storage unit 120 may additionally include a subscriber identity module (SIM) card for storing a user's profile information.

The storage unit 120 is tasked with storing various data and applications that are needed to operate the flexible display device and provide a user interface (UI). For instance, the storage unit 120 may store software that describes a user interface allowing a user to interact with the flexible display device 100 according to the methods provided by the present invention. In addition, applications stored on the storage unit 120 may be a set of instructions that are processed by the system controller 110 in order to execute and run the application.

In some embodiments of the present invention, the storage unit 120 may further include access to remote storage in a cloud storage computing environment. The remote storage may be accessed via the communications unit 130.

The communications unit 130, as illustrated in FIG. 1, may include RF circuitry that allows access to outside communications networks such as the Internet, Local Area Networks (LANs), Wide Area Networks (WANs) and the like. The wireless communications networks accessed by the communications unit 130 may follow various communications standards and protocols including, but not limited to, Global System for Mobile Communications (GSM), Enhanced Data GSM Environment (EDGE), code division multiple access (CDMA), wideband code division multiple access (W-CDMA), time division multiple access (TDMA), Bluetooth, Wireless Fidelity (Wi-Fi), Short Message Service (SMS) text messaging and any other relevant communications standard or protocol that allows for wireless communication by the flexible display device 100. In some embodiments of the present invention, the communications unit may also include a tuner for allowing for the reception of broadcast signals according to, for example, the digital multimedia broadcasting (DMB), digital video broadcasting technologies, advanced television systems committee (ATSC), integrated services digital broadcasting (ISDB) or digital terrestrial multimedia broadcast (DTMB) standards.

Additionally, the communications unit 130 may include various input and output interfaces (not shown) for allowing wired data transfer communication between the flexible display device 100 and an external electronics device. The interfaces may include, for example, interfaces that allow for data transfers according to the family of universal serial bus (USB) standards, the family of IEEE 1394 standards or other similar standards that relate to data transfer.

The flexible display unit 140 illustrated in FIG. 1 includes a flexible display that is preferably made from liquid crystal diode (LCD) display technology, organic light emitting diode (OLED) display technology, electroluminescent display (ELD) technology or other similar flexible display technologies. The flexible display unit 140 provides a visual output to a user for interacting with a user interface of the flexible display device 100. The visual output displayed on the flexible display may include text, graphics, video and any combination thereof. One of the means a user may interact with the flexible display device 100 is via a user interface that is displayed on a flexible display of the flexible display unit 140. Such a user interface may be comprised primary of text, graphics and video related to applications stored on the storage unit 120.

The flexible display unit 140 illustrated in FIG. 1 may additionally include a touch sensitive subsystem that comprises circuitry for allowing the flexible display 140 to be touch sensitive. The touch sensitive subsystem allows a user to interact with a user interface displayed on the flexible display via touch inputs made on the flexible display. Touch inputs detected by the touch sensitive subsystem are transmitted to the system controller 110 for processing. According to the present invention the detection of multi-touch inputs is supported, such that a multi-touch touch input may be detected by the touch sensitive subsystem and recognized by the system controller 110 as a multi-touch input.

The sensor unit 150, illustrated in FIG. 1, may include a plurality of flex sensors that are able to detect a location of a bend on the flexible display device 100 resulting from a user's bending of the flexible display device 100. Additionally, the flex sensors may also detect a degree of bend made on the flexible display device 100 resulting from a user's flex input. In other words, the plurality of flex sensors are capable of detecting a location on the flexible display device 100 that is being bent by a user's flex input. In addition, the plurality of flex sensors may measure a bending degree to which the flexible display device 100 is bent by a user's flex input and also calculate a time period during which a user's flex input bending on the flexible display device 100 is recognized. It should be understood that all measurement information taken by the sensor unit 150 may be converted to an electronic signal prior to a transmission to the system controller 110. The system controller 110 may then receive the measurement information from the sensor unit 150 and control the various components of the flexible display device 100 accordingly.

According to some embodiments of the present invention, the flex sensors of the sensor unit 150 may be implemented as pressure detecting sensors placed throughout the flexible display device 100. For example the pressure detecting sensors may be a piezoelectric pressure detecting sensors. When a user initiates a flexing of the flexible display device 100, this flex input will result in a bend at a location of the flexible display device 100 that coincides with at least one pressure detecting sensor. The pressure detecting sensor at this bend location is then activated and proceeds to measure a degree of pressure impacted at the bend location. In most instances the resulting bend on the flexible display device 100 due to a flex input will coincide with more than a single pressure detecting sensor, and thus a plurality of pressure detecting sensors will likely be activated for any given flex input. In this way, the sensor unit 150 is able to detect locations on the flexible display device 100 that are bent due to a user's flex input.

When information indicating the activation of pressure detecting sensors is transmitted from the sensor unit 150 to the system controller 110, the system controller 110 is able to recognize that a flex input is being performed. The pressure measurements taken by the pressure detecting sensors that are activated due to a user's flex input are transmitted to the system controller in real-time. The pressure measurements received by the system controller 110 may then be interpreted by the system controller 110 as representing an angular degree of bend in the flexible display device 100. For instance, if the system controller 110 receives a low pressure measurement from a pressure detecting sensor located at a first location of the flexible display device 100, the system controller 110 may interpret the low pressure measurement as there being a low degree of angular bend on the flexible display device 100 at the first location. Similarly, if the system controller 110 receives a high pressure measurement from a pressure detecting sensor located at a second location of the flexible display device 100, the system controller 110 may interpret the high pressure measurement as there being a high degree of angular bend in the flexible display device 100 at the second location.

To operate in this way, a given pressure measurement taken by a pressure detecting sensor may be associated to a given degree of angular bend. Information assigning measured pressure levels to interpreted degrees of bending on the flexible display device 100 may be stored in the storage unit 120. The list may be a pre-stored list or downloaded onto the storage unit 120 from an external source via the communications unit 130. The list may also be updateable at a later time via the communications unit 130 or user.

According to some embodiments of the present invention, the flex sensors may alternatively be implemented as tension detecting sensors placed throughout the flexible display device 100. For example the tension detecting sensors may be piezoelectric tension detecting sensors. When a user initiates a flexing of the flexible display device 100, this flex input will result in a bend at a location of the flexible display device 100 that coincides with at least one tension detecting sensor. The tension detecting sensor at this bend location is then activated and proceeds to measure a degree of tension stress impacted at the bend location.

In most instances the resulting bend on the flexible display device 100 due to a flex input will coincide with more than one tension detecting sensor, and thus a plurality of tension detecting sensors will likely be activated for any given flex input.

In addition, a tension detecting sensor according to the present invention may be configured to be capable of detecting a user's flex input that bends a flexible display device in more than one direction. For instance at any given location there may be a pair of tension detecting sensors that are placed in a stacked orientation having a top tension detecting sensor and a bottom tension detecting sensor. In this way, for a first bend on the flexible display device 100 in a first direction, the top tension detecting sensor may detect a stress caused by a pulling on the top tension detecting sensor, and the bottom tension detecting sensor may detect a stress caused by a condensing on the bottom tension detecting sensor. It follows then that for a second bend on the same flexible display device 100 in a second direction (where the second direction is opposite the first direction), the top tension detecting sensor may detect a stress caused by a condensing on the top tension detecting sensor, and the bottom tension detecting sensor may detect a stress caused by a pulling on the bottom tension detecting sensor.

As mentioned earlier for the cases where the flex sensors are implemented as pressure detecting sensors, a given tension stress measurement taken by a tension detecting sensor may be associated to a given degree of angular bend on the flexible display device 100. Information assigning measured tension levels to interpreted degrees of bending on the flexible display device 100 may be stored in the storage unit 120. The list may be a pre-stored list or downloaded onto the storage unit 120 from an external source via the communications unit 130. The list may also be updateable at a later time via the communications unit 130 or user.

In an alternative embodiment of the present invention, the flex sensors may alternatively be implemented as current detecting sensors placed throughout the flexible display device 100. The current detecting sensors are able to measure varying degrees of bending on the flexible display device 100 by allowing an electric current to flow through each current detecting sensor placed throughout the flexible display device 100. Then when a user initiates a flexing of the flexible display device 100, the current detecting sensors are able to identify changes in current and correlate the changes in current as degrees of angular bending on the flexible display device 100.

For example, a current detecting sensor may detect a change in current running through it and transmit such information to the system controller 110. The system controller 110 is then able to identify the location of the current detecting sensor that detected a change in current, and recognize that the flexible display device 100 is being bent at that location. Also by calculating the amount of current change detected by a current detecting sensor, the system controller 110 is able to calculate a degree of bend impacted on the flexible display device 100 due to a user's flex input.

A change in current may be calculated by referencing a current that runs through a current detecting sensor in a default state. An example of a default state may be where the flexible display device 100 lays flat and no flex input is being performed on the flexible display device 100. Consequently the current detecting sensors will detect a natural current value flowing through the current detecting sensors in the default state, and the natural current value may be observed by the system controller 110 and stored in the storage unit 120.

Then during the performance of a flex input by a user, the bending of the flexible display device 100 will result in at least one current detecting sensor to be bent along a bend line. The bending of the current detecting sensor will fundamentally change an innate electrical profile of the current detecting sensor when compared to the default state. For instance the resistance characteristic of the current detecting sensor may be altered depending upon the degree of bending impacted on the current detecting sensor during the performance of the flex input. So as the degree of bending fluctuates during the performance of the flex input by a user, so too will the resistance characteristic of the current detecting sensor fluctuate, and ultimately this will cause the current flowing through the current detecting sensor to fluctuate correspondingly. In this case, the physical bending of the current detecting sensor will alter an innate resistance characteristic of the current detecting sensor and this in turn will correspondingly fluctuate the current flowing through the current detecting sensor.

As mentioned earlier for the cases where the flex sensors are implemented as pressure detecting sensors, a given change of current measurement taken by a current detecting sensor may be associated to a given degree of angular bend on the flexible display device 100. Information assigning measured current change levels to interpreted degrees of bending on the flexible display device 100 may be stored in the storage unit 120. The list may be a pre-stored list or downloaded onto the storage unit 120 from an external source via the communications unit 130. The list may also be updateable at a later time via the communications unit 130 or user.

The audio I/O unit 160 illustrated in FIG. 1 may include a speaker or headphone interface for outputting audio signals originating from the storage unit 120 of the flexible display device 100. The audio I/O unit 160 may also include a microphone for inputting audio signals into the flexible display device 100. Audio signals that are inputted to the flexible display device 100 through the microphone may be transmitted to the system controller 110 for processing.

The power unit 170 illustrated in FIG. 1 is a power source for providing the power to operate the various components/units of the flexible display device 100. The power unit 170 may include a battery or an interface for providing power from external power sources (e.g. direct current adaptor, alternating current adaptor).

According to some embodiments of the present invention, certain units of the flexible display device 100 may not share the physical characteristic of being flexible, or may only be capable of a low degree of flexibility. For instance the components that make up the power unit 170 and the audio I/O unit 160 may not share the same degree of flexibility as the flexible display unit 140. In such a case, the present invention allows for placing certain units of the flexible display device 100 in a dedicated area of the flexible display device 100 that does not need to be fully flexible. For instance, units of the flexible display device 100 that have a low flexibility characteristic may be gathered within a bottom area, top area, middle area or peripheral area of the flexible display device 100. In any case, certain units of the flexible display device 100 may be gathered within a dedicated area of the flexible display device 100, where the dedicated area may have a lower flexibility than other areas of the flexible display device 100. Further, in some embodiments of the present invention the flexible display device 100 may be configured such that the dedicated area may not be intended to be bent for inputting a user's flex input command.

Figure 2:
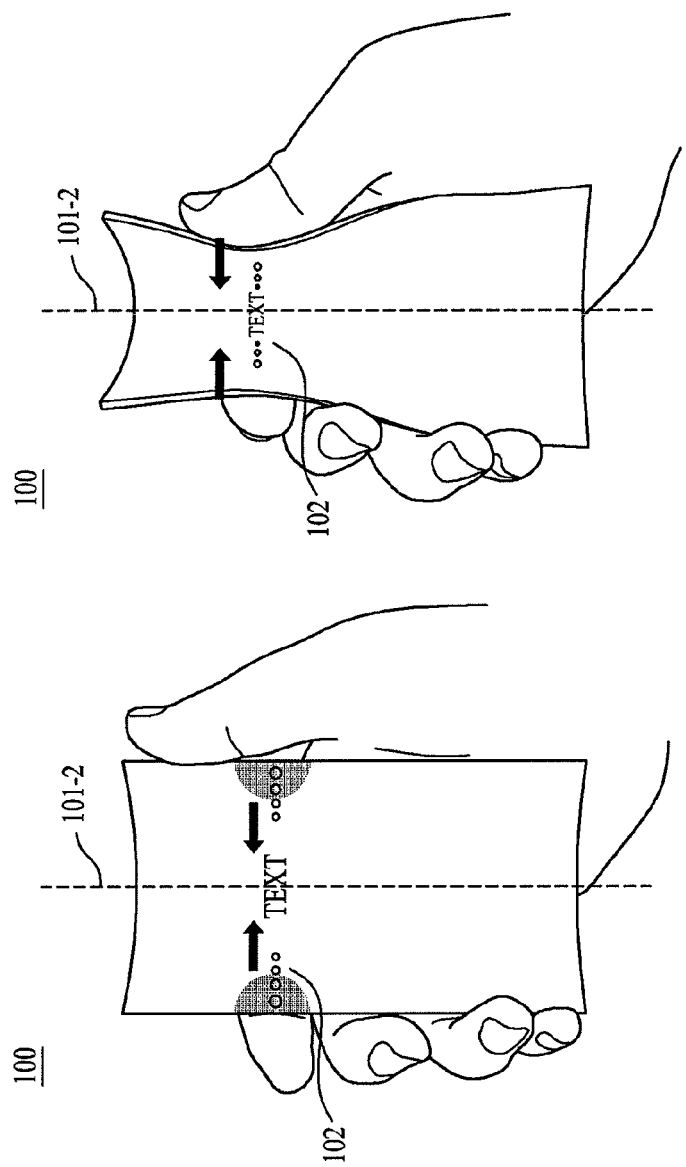
FIG. 2 illustrates a first method of bending a flexible display device, according to the present invention.

FIG. 2 illustrates an example for a first bend line 101-2 resulting on the flexible display device 100 due to the performance of a flex input by a user, according to some embodiments of the present invention. The bend line 101-2 illustrated in FIG. 2 is a vertical bend line running the portrait length of the flexible display device 100. According to this first example, the flex input causes the front side of the flexible display device 100 to bend inward in a concave shape centered on the bend line 101-2. FIG. 2 is a front side view of the flexible display device 100, where the front side view is distinguishable for including a flexible display.

A visual cue 102 is illustrated in FIG. 2 to demonstrate, at least, the placement of a front side flexible display on the flexible display device 100. During the performance of the flex input illustrated by FIG. 2, or just prior to the initiation of the flex input, the visual cue 102 is displayed on the front side of the flexible display device 100. Then during the performance of the flex input, the display of the visual cue 102 may be adaptively modified in response to the changing degree of bending on the flexible display device 100 caused by the flex input.

Figure 3:
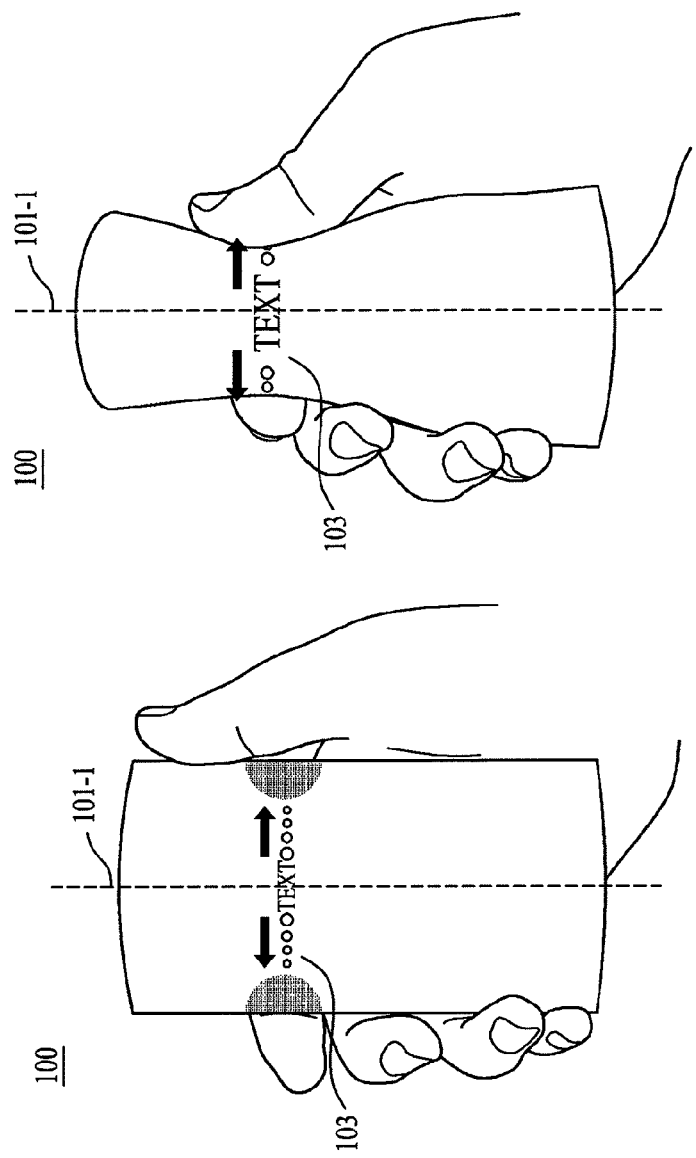
FIG. 3 illustrates a second method of bending a flexible display device, according to the present invention.

FIG. 3 illustrates an example for a second bend line 101-1 resulting on the flexible display device 100 due to the performance of a flex input by a user, according to some embodiments of the present invention. The bend line 101-1 illustrated in FIG. 3 is a vertical bend line running the portrait length of the flexible display device 100. According to this second example, the flex input causes the front side of the flexible display device 100 to bend outward in a convex shape centered on the bend line 101-1. FIG. 3 is a front side view of the flexible display device 100, where the front side view is distinguishable for including a flexible display.

A visual cue 103 is illustrated in FIG. 3 to demonstrate, at least, the placement of a front side flexible display on the flexible display device 100. During the performance of the flex input illustrated by FIG. 3, or just prior to the initiation of the flex input, the visual cue 103 is displayed on the front side of the flexible display device 100. Then during the performance of the flex input, the display of the visual cue 103 may be adaptively modified in response to the changing degree of bending on the flexible display device 100 caused by the flex input.

The flex inputs depicted in FIG. 2 and FIG. 3 describe flex inputs that bend a flexible display device according to some embodiments of the present invention. However the flex inputs described in FIG. 2 and FIG. 3 should not be interpreted as being limiting in nature. The flex inputs described by FIG. 2 and FIG. 3 are exemplary in nature and it should be understood that it is within the scope of the present invention to allow for flex inputs that bend the flexible display device of the present invention in a variety of different directions and ways. For instance a flex input may only bend a corner of a flexible display device according to some embodiments of the present invention.

In any case, no matter the type of flex input that is made on a flexible display device of the present invention, it is an important objective of the present invention to accurately recognize a bending on the flexible display device as a valid flex input made by a user. This is an important feature of the present invention because not all bends of a flexible display device may be intended by a user to be a flex input command. For instance, if a flexible display device is kept in the user's pocket, it is foreseeable that slight bends in the flexible display device will occur as the user moves around. However these slight bends are not intended by a user to be valid flex input commands, and accordingly, they should not be recognized as valid flex input commands. Therefore, the flexible display device should be configured to ignore such slight bends in the flexible display device and have a mechanism for distinguishing valid flex inputs as intended by a user, from unintentional slight bends on a flexible display device.

Figure 4:
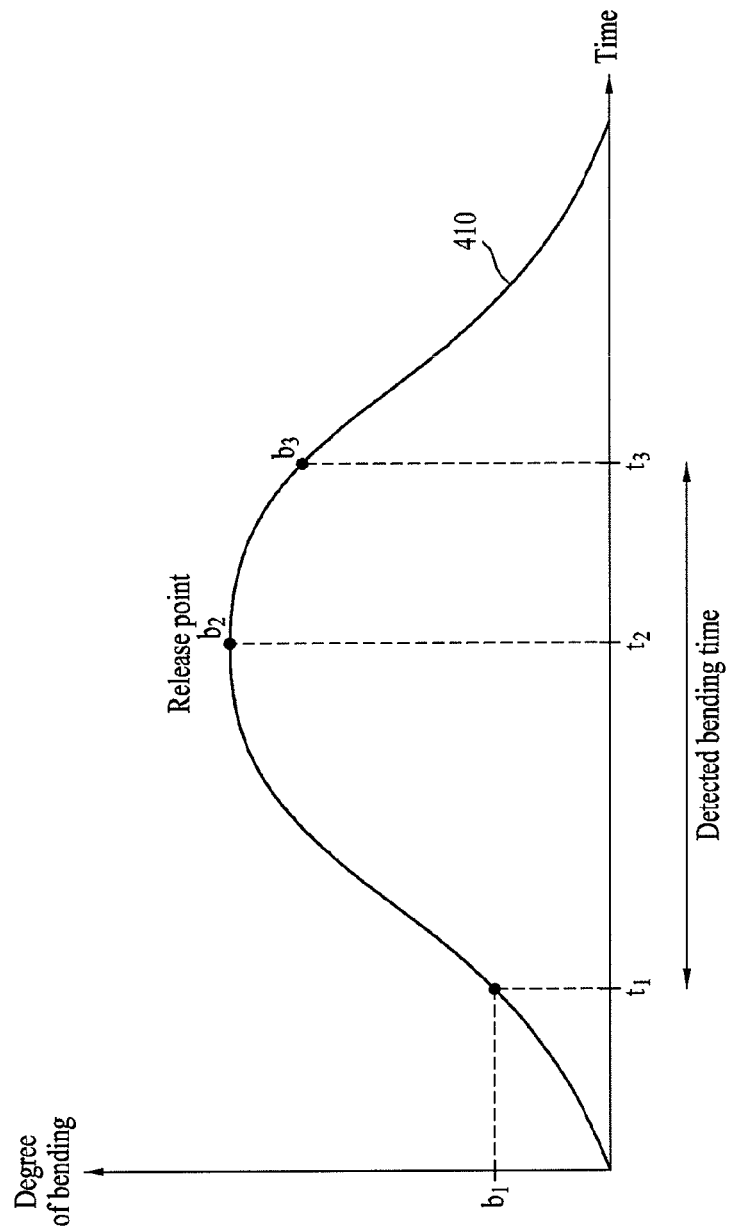
FIG. 4 illustrates a graph plotting a measured degree of bending on a flexible display device versus time for a single flex input, according to the present invention.

To accomplish this task, the present invention introduces the implementation of error buffers when measuring the bend of a user's flex input on a flexible display device. To better describe the error buffers, FIG. 4 illustrates a graph that plots a measured degree of bending (y-axis) versus time (x-axis). The graph is intended to represent a measured degree of bending on a flexible display device during the implementation of a user's flex input 410.

When a user first initiates the flex input 410 by beginning to bend the flexible display device, a valid flex input is not immediately recognized. Instead, the flex input 410 will not be recognized as a valid flex input until a measured degree of bending surpasses an error threshold value. This is the initial error buffer, and may be referred to as the error threshold value, where in this case the error threshold value corresponds to the first bending value $b_1$. On the graph, the point at which the flex input 410 surpasses the error threshold value is seen to be located at $(t_1, b_1)$. Although the error threshold value is seen to occur at time the error threshold value is not necessarily time dependent. Instead, the error threshold value may be a predetermined value that identifies a measured degree of bending where all measured degrees of bending that are less than the error threshold value are not to be recognized as a valid flex input. So the error threshold value serves to disregard slight degrees of bend on the flexible display device that may occur unintentionally.

As the user's flex input 410 continues to bend the flexible display device, eventually the measured degree of bending detected on the flexible display device is seen to surpass the error threshold value at ($t_1$, $b_1$), where $b_1$ corresponds to the error threshold value. Then starting from the time, $t_1$, when the measured degree of bending surpasses the error threshold value, the flexible display device will begin to acknowledge and calculate the flex input 410 as a valid flex input.

Later during the course of the user's flex input 410, there will come a time where the user will cease bending the flexible display device further, and instead begin to let up on the flexible display device. This scenario correlates to the apex point on the flex input 410 graph of FIG. 4, and may otherwise be referred to as the release point ($t_2$, $b_2$). Although preferably the release point value, in this case the second bending value $b_2$, will coincide with a maximum degree of bending that is allowed on the flexible display device, according to some embodiments this does not need to be the case. Thus the release point value may correspond to the maximum degree of bending that is allowed on the flexible display device, or according to other embodiments the release point value may generally be the point at which the measured degree of bending on the flexible display device is detected to cease increasing and begin decreasing.

At the release point ($t_2$, $b_2$) when the measured degree of bending for the corresponding flex input 410 is at its maximum, the flexible display device does not immediately end the calculation for the valid flex input related to the user's flex input 410. Instead the flexible display device will wait until the measured degree of bending has reached a release threshold value. This is considered to be a backend error buffer, wherein in this case the release threshold value correlates to the third bending value $b_3$. On the graph, the flex input 410 is seen to reach the release threshold value at point ($t_3$, $b_3$). So according to the present invention, the recognition and calculation for the valid flex input related to the user's flex input 410 is not stopped immediately at the first instance of a decrease in the measured degree of bending. This is done as a precaution against unintended fluctuations in a user's flex input.

The actual release threshold value may be based on the release point value. Specifically, the release threshold value may be based on a percentage of the release point value. For instance, the release threshold value may be predetermined to be 90% of the release point value. Or put another way, the release threshold value that indicates the end of a valid flex input may be based on a 10% decrease in the measured degree of bending from the measured degree of bending detected at the release point. So in this case, the release threshold value that correlates to the third bending value $b_3$ may be 90% of the release point value that correlates to the second bending value $b_2$.

Alternatively, the release threshold value may be a predetermined number of units less than the release point value. For instance the release threshold value that correlates to the third bending value $b_3$ may be ten units less than the measured degree of bending detected at the release point that correlates to the second bending value $b_2$.

Alternatively, the release threshold value that indicates the end of a flex input may be based on the error threshold value. So in this case, the release threshold value that correlates to the third bending value $b_3$ may be equal to the error threshold value that correlates to the first bending value $b_1$. In some embodiments the release threshold value may be slightly less than or slightly more than the error threshold value (e.g. 10% less or 10% more).

Alternatively, the release threshold value may be a predetermined number of units more or less than the error threshold value. For instance the release threshold value that correlates to the third bending value $b_3$ may be five units more or less than the error threshold value that correlates to the first bending value $b_1$.

In this way, a valid flex input based on the user's flex input 410 is seen to end, or stop being recognized, after the measured degree of bending falls beneath the release threshold value. Put another way, the user's flex input 410 will be recognized as a valid flex input from the time the measured degree of bending surpasses the error threshold value to the time the measured degree of bending falls below the release threshold value. In this case, the detected bending time for a valid flex input resulting from the user's flex input 410 is seen to last from time $t_1$ to time $t_3$.

Figure 5:
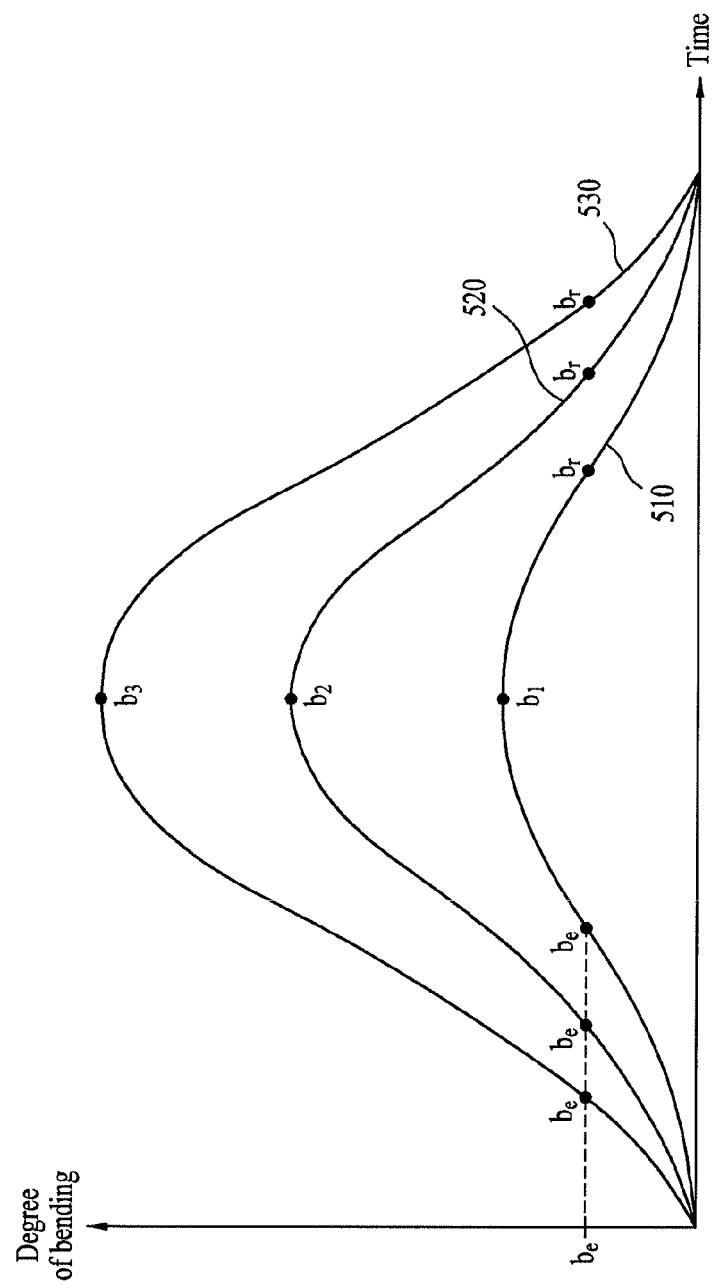
FIG. 5 illustrates a plurality of graphs, where each graph represents a separate single flex input having varying maximum degrees of detected bending, according to the present invention.

FIG. 5 illustrates a graph that plots a measured degree of bending (y-axis) on a flexible display device against time (x-axis) according to the present invention. Multiple graphs are provided for representing a user's first flex input 510, second flex input 520 and third flex input 530. Each of the graphs representing a user's first flex input 510, second flex input 520 and third flex input 530 are provided for exemplary purposes to represent various flex inputs that reach various maximum measured degrees of bending $b_1$, $b_2$ and $b_3$ respectively. Each of the first flex input 510, second flex input 520 and third flex input 530 may begin to be recognized as a valid flex input at the point during the course of the respective flex input where the measured degree of bending surpasses an error threshold value $b_e$. Then after being recognized as a valid flex input, each respective valid flex input will last until the measured degree of bending falls below a release threshold value $b_r$. So a valid flex input corresponding to each of the first flex input 510, second flex input 520 and third flex input 530 may be recognized and calculated to last from the time each respective flex input surpasses the error threshold value $b_e$ to the time each respective flex input falls below the release threshold value $b_r$.

Now although the release threshold value ID, is depicted in FIG. 5 as sharing the same value as the error threshold value $b_e$, any of the above mentioned methods for determining the release threshold value may be implemented. Therefore, if the release threshold value $b_r$ is not simply set to be equal to the error threshold value $b_e$, then each of the each of the first flex input 510, second flex input 520 and third flex input 530 may each have different corresponding release threshold values. For instance, if the release threshold value $b_r$ is set to be tied to a maximum measured degree of bending detected for each respective flex input, then each of the first flex input 510, second flex input 520 and third flex input 530 may have differing release threshold values assigned to them as they each have differing maximum measured degrees of bending.

The present invention also envisions methods for recognizing a double flex input made by a user on the flexible display device. The recognition of a double flex input is similar to the recognition of a single valid flex input described above, with the added requirement that the two back to back valid flex inputs must be accomplished within a predetermined time limit. A double flex input that is recognized by the flexible display device may initiate a function that is unique from any function that is initiated by any single valid flex input. The method for recognizing a valid double flex input that is distinguishable from the succession of two valid flex inputs is described as follows.

Figure 6:
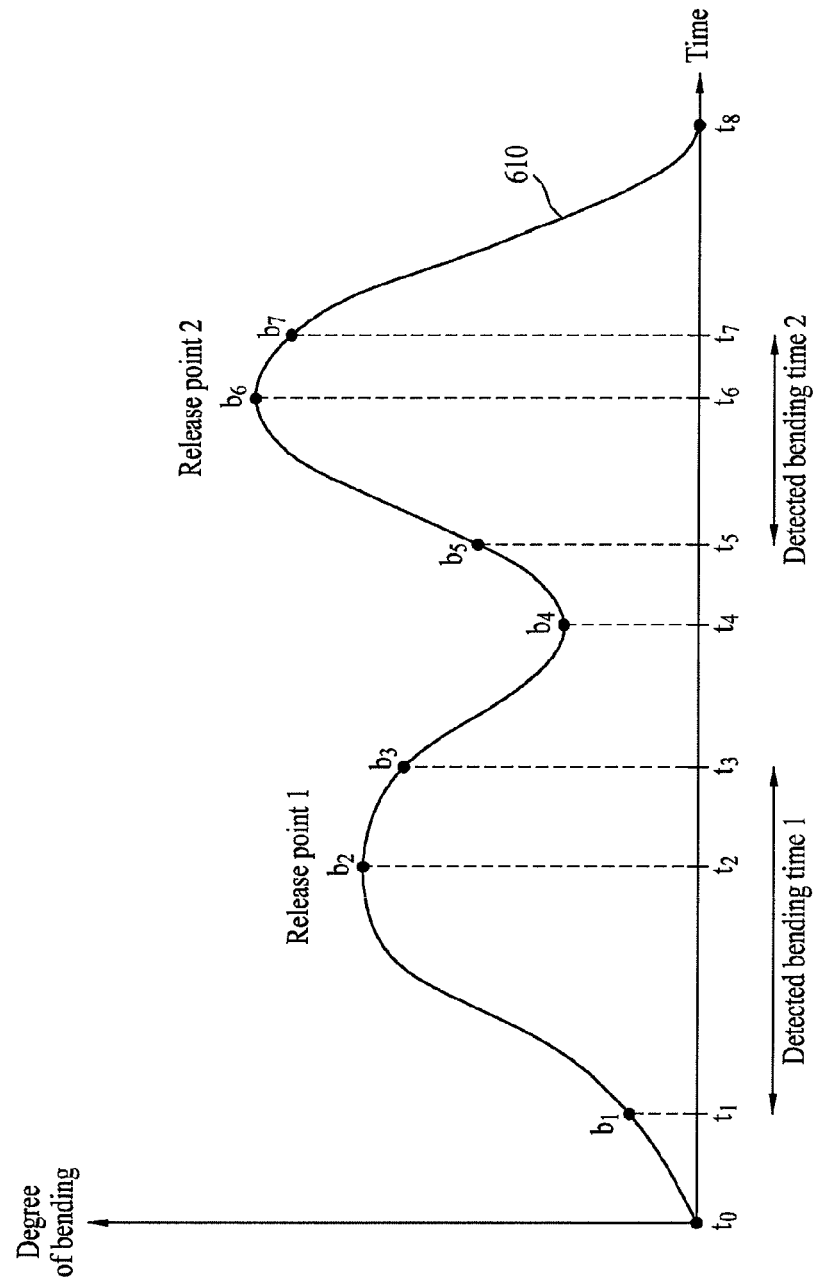
FIG. 6 illustrates a graph plotting a measured degree of bending on a flexible display device versus time for a double flex input, according to the present invention.

FIG. 6 illustrates a graph that depicts a valid double flex input that may be recognized by a flexible display device of the present invention. A user's double flex input 610 is actually comprised of a first flex input and a second flex input that follows successively. The first flex input of the double flex input 610 is generally represented by the first curve (i.e. $t_0$-$t_4$), and the second flex input of the double flex input 610 is generally represented by the second curve (i.e. $t_4$-$t_8$).

The first flex input of the double flex input 610 begins much like the flex input described for FIG. 4. Up until the measured degree of bend surpasses a first error threshold value the first flex input is not recognized by the flexible display device as a first valid flex input. This initial degree of bending is discarded as part of the initial error buffer. It is not until the measured degree of bending of the user's first flex input surpasses the first error threshold value that the flexible display device will begin to recognize a first valid flex input. In this case the first error threshold value is represented by the first bending value $b_1$. And on the graph provided by FIG. 6 the measured degree of bending detected from the user's first flex input is seen to surpass the first error threshold value at the point ($t_1$, $b_1$). So starting from point ($t_1$, $b_1$) the flexible display device will begin to recognize and calculate a first valid flex input.

Release point 1 is then the point at which the measured degree of bending on the flexible display device due to the user's first flex input is found to cease increasing and begin decreasing. In the graph provided by FIG. 6 this release point 1 is represented by point ($t_2$, $b_2$). As in the previous description, the recognition and calculation of the first valid flex input is not immediately stopped at the first instance where the measured degree of bending is found to cease increasing and begin decreasing (e.g. in this case release point 1). Instead, a backend error buffer in the form of a first release threshold value is offered. The first release threshold value is the value at which the measured degree of bending due to the first flex input must fall below before an end to the first valid flex input is recognized. In this case the first valid flex input will cease to be recognized and calculated after the measured degree of bending falls below the first release threshold value represented by the third bending value $b_3$. The actual methods for determining the value of the first release threshold value may follow any one of the methods described throughout this description.

In this way the first valid flex input is seen to last from the time the measured degree of bending surpasses the first error threshold value, to the time the measured degree of bending falls below the first release threshold value. According to FIG. 6, then, the first valid flex input is detected to last from $t_1$ to $t_3$.

Following the end of the first valid flex input at $t_3$, the user may continue to release the bend on the flexible display device. This is represented by the measured degree of bending continuing to fall from $t_3$ to $t_4$ following the end of the first valid flex input at $t_3$. Then at time $t_4$ the user's flex input is seen to once again increase a bend on the flexible display device as evidenced by the increasing slope of the graph in FIG. 6. The increasing slope starting from time $t_4$ represents a renewed increasing measured degree of bending. Therefore the second flex input may be understood as starting at time $t_4$.

Now similar to how the first flex input only begins to be recognized as a first valid flex input after surpassing the first error threshold value, the second flex input may only begin to be recognized and calculated as a second valid flex input after surpassing a second error threshold value. A second initial error buffer is therefore seen to run from time $t_4$ to $t_5$ where the second flex input has not yet surpassed the second error threshold value, as represented by a fifth bending value $b_5$.

The measured degree of bending that constitutes the second error threshold value may be based on the first error threshold value. For instance the second error threshold value may be equal to the first error threshold value. Alternatively, the second error threshold value may be assigned to be a percentage more or less of the first error threshold value (e.g. 10% more or less than the first error threshold value). Or the second error threshold value may be assigned to be a predetermined number of units more or less than the first error threshold value (e.g. 10 units more or less than the first error threshold value).

Or alternatively, the second error threshold value may be based on the measured degree of bending at the point where the second flex input begins. In this case this is the fourth degree of bending $b_4$, where the user ceases to release the first flex input and resumes bending the flexible display device as the initiation of the second flex input. For instance the second error threshold value may be assigned to be a percentage more than the measured degree of bending at the point where the second flex input begins (e.g. 10% more than $b_4$). Or the second error threshold value may be assigned to be a predetermined number of units more than the measured degree of bending at the point where the second flex input begins (e.g. 10 units greater than $b_4$).

In any case, once the measured degree of bending due to the second flex input surpasses the second error threshold value, the second valid flex input will begin to be recognized and calculated. In this case, the second valid flex input will begin to be recognized and calculated once the measured degree of bending surpasses the second release threshold value corresponding to the fifth bending value $b_5$.

Then the user may continue to bend the flexible display device as the second valid flex input until release point 2 represented by point ($t_6$, $b_6$). Release point 2 is where the second flex input ceases increasing and begins decreasing. In other words, the user is seen to begin releasing the second flex input at release point 2. At this point a second backend error buffer will be initiated. The second backend error buffer will last from time $t_6$ corresponding to release point 2, to the time the measured degree of bending due to the second flex input falls below a second release threshold value at time $t_7$. In this case, the second release threshold value in FIG. 6 is represented by the seventh bending value $b_7$.

The second release threshold value may be based on the first release threshold value. For instance, the second release threshold value may be equal to the first release threshold value. Or the second release threshold value may be a percentage more or less than the first release threshold value (e.g. 10% more or less than the first release threshold value). Or the second release threshold value may be a predetermined number of units more or less than the first release threshold value (e.g. 10 units more or less than the first release threshold value).

Or alternatively, the second release threshold value may be based on the measured degree of bending at release point 2. For instance the second release threshold value may be a percentage less than the measured degree of bending at release point 2 (e.g. 10% less than the measured degree of bending at release point 2). Or the second release threshold value may be a predetermined number of units less than the measured degree of bending at release point 2 (e.g. 10 units less than the measured degree of bending at release point 2).

In any case, the second valid flex input is seen to end after falling below the second release threshold value, which in FIG. 6 is represented by the seventh bending value $b_7$. So the second valid flex input lasts from time $t_5$ to $t_7$.

The essential requirement for a user to successfully accomplish a valid double flex input is to have the second valid flex input follow within a predetermined amount of time of the first valid flex input. According to some embodiments, this may require that a second valid flex input must begin to be recognized within a predetermined time following the recognized end of a first valid flex input. In other words, a valid double flex input may be recognized if a second flex input surpasses a second error threshold value within a predetermined amount of time following a first valid flex input falling below a first release threshold value. In the graph illustrated by FIG. 6 this translates to the time between $t_3$ and $t_5$ being less than, or alternatively less than or equal to, a predetermined amount of time (e.g. 1 second).

Alternatively, according to some embodiments a valid double flex input may require that a second valid flex input be recognized to end within a predetermined time following the recognized end of a first valid flex input. In other words, a valid double flex input may be recognized if a second valid flex input falls below a second release threshold value within a predetermined amount of time following a first valid flex input falling below a first release threshold value. In the graph illustrated by FIG. 6 this translates to the time between $t_3$ and $t_7$ being less than, or alternatively less than or equal to, a predetermined amount of time (e.g. 1 second).

While the above example for the recognition of a valid double flex input has been described as requiring the detection of a first error threshold value, first release threshold value, point of releasing a first flex input to initiating a second flex input (e.g. ($t_4$, $b_4$) on the graph of FIG. 6), a second error threshold value and a second release threshold value, other embodiments of the present invention may not require the detection of as many degree of bending points.

In a simplified method for recognizing a valid double flex input only a first error threshold value point, a point of releasing a first flex input to initiating a second flex input (e.g. ($t_4$, $b_4$) on the graph of FIG. 6) and a second error threshold value point may be required to be detected in order to recognize a valid double flex input. According to this simplified method, a user may initiate a first flex input on a flexible display device by beginning to bend the flexible display device. Then as a first measured degree of bending is detected due to the user's first flex input, the first measured degree of bending is continuously compared against a first error threshold value. This first error threshold value may also be represented by the first bending value $b_1$ illustrated in FIG. 6. Now while the first measured degree of bending is detected to be below the first error threshold value a first valid flex input is not recognized.

Later, when the measured first degree of bending is detected to have surpassed the first error threshold value, a first valid flex input is recognized. However, unlike the previously described method for recognizing a valid double flex input, this simplified method does not look to detect when the measured first degree of bending falls below a release threshold value. Instead, following the detection of the measured first degree of bending surpassing the first error threshold value as represented to occur at point ($t_1$, $b_1$) on FIG. 6, the next point to be detected is the point at which the release of the first flex input transitions to an initiation of a second flex input. On FIG. 6 this point where the release of the first flex input transitions to an initiation of a second flex input is represented by point ($t_4$, $b_4$). The detection of this transition point is important in order to recognize that a second flex input is being made on the flexible display device.

The transition point ($t_4$, $b_4$) can be thought of as essentially a re-bending on the flexible display device following the release of the first flex input. So following the detection of this transition point, a measured second degree of bending may be made due to a second flex input. Then the measured second degree of bending is continuously measured until it is detected that the measured second degree of bending surpasses a second error threshold value. The second error threshold value may be represented by the fifth bending value $b_5$ in FIG. 6.

In order to determine whether a valid double flex input has been accomplished according to this simplified method, the time between the detection of the measured first degree of bending surpassing the first error threshold value and the detection of the measured second degree of bending surpassing the second error threshold value is calculated. This time is represented in FIG. 6 as the time between $t_1$ and $t_5$. If this time is less than, or alternatively less than or equal to, a predetermined amount of time then a valid double flex input may be recognized according to this simplified method of the present invention.

It should be noted that the second error threshold value according to the simplified method may be determined according to any of the methods described throughout this description.

In any case, for a valid double flex input to be recognized it is important that a second flex input is required to follow a first flex input within a fairly short amount of time. This is to ensure that a user's intention to input a valid double flex input may be distinguishable from a user's intention to input two separate flex inputs. This is important because a double flex input may take on a unique significance in and of itself. So allowing a prolonged pause in between the two flex inputs of a valid double flex input may overlap with a user's intention to implement two separate flex inputs.

For example, a valid double flex input may be attributed to accomplishing a delete file task on the flexible display device, while a first valid flex input by itself may be attributed to opening the file and a later valid second flex input may be attributed to closing the file. In this example, if a valid double flex input were allowed to have a prolonged pause in between the two flex inputs that comprised the valid double flex input, this may interfere with a user's ability to implement two separate flex inputs that were not intended to be a valid double flex input.

Figure 7:
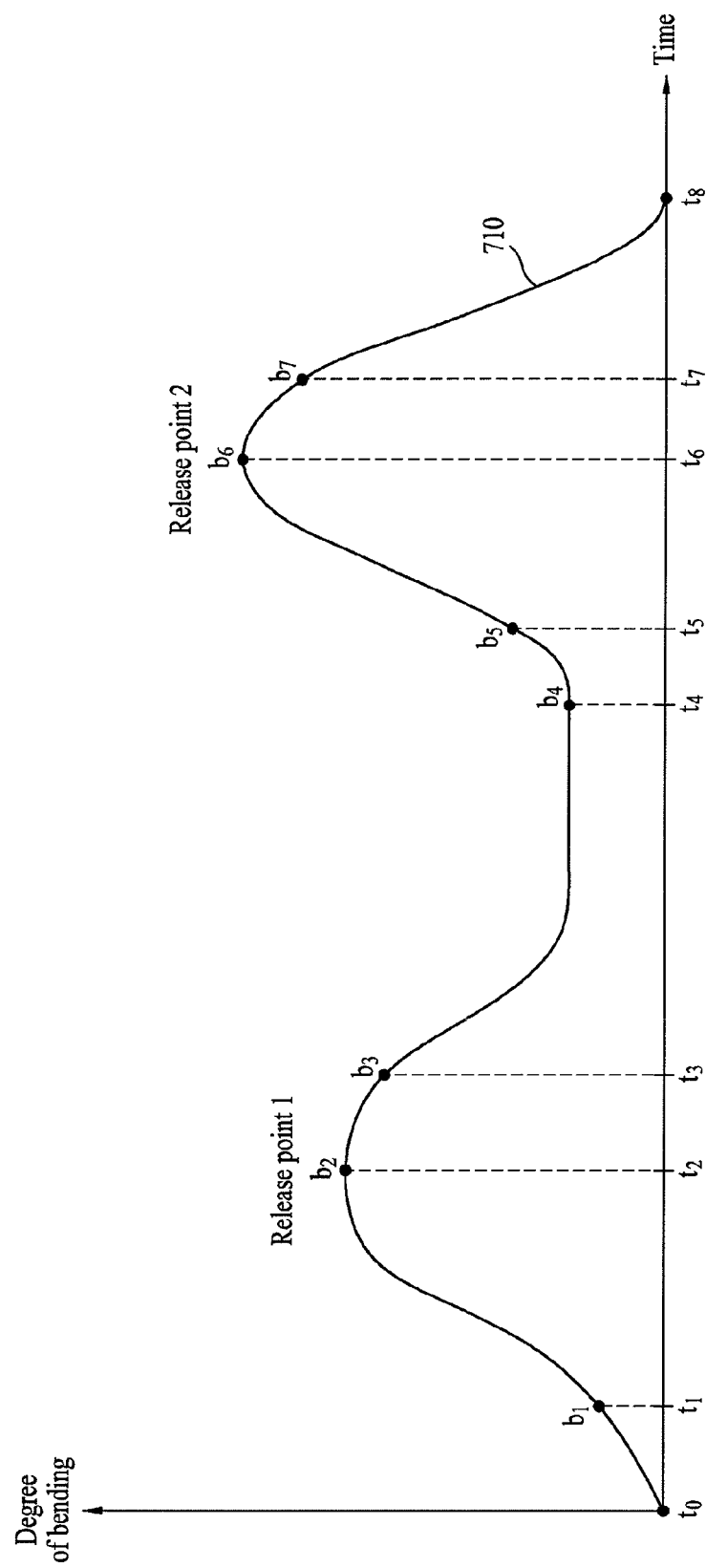
FIG. 7 illustrates a graph plotting a measured degree of bending on a flexible display device versus time for two successive single flex inputs, according to the present invention.

FIG. 7 serves to illustrate a situation where the time in between two flex inputs are too far apart to be recognized as a valid double flex input. A user's overall flex input is depicted by the user input graph 710. From a detection standpoint, the flexible display device will first recognize a first valid flex input. Then following the recognized end of the first valid flex input, the flexible display device will count the time until a valid second flex input is recognized. Because there is a prolonged time between the end of the first valid flex input at time $t_3$ and the recognition of the second valid flex input at time $t_5$, the flexible display device will determine that a valid double flex input cannot be recognized. Therefore the first valid flex input that runs from time $t_1$ to $t_3$ and the second valid flex input that runs from time $t_5$ to $t_7$ will be recognized as two separate flex input commands and not a single valid double flex input command. This is assuming that the time in between the two valid flex input commands ($t_3$ to $t_5$) is greater than a predetermined amount of time.

Figure 8A:
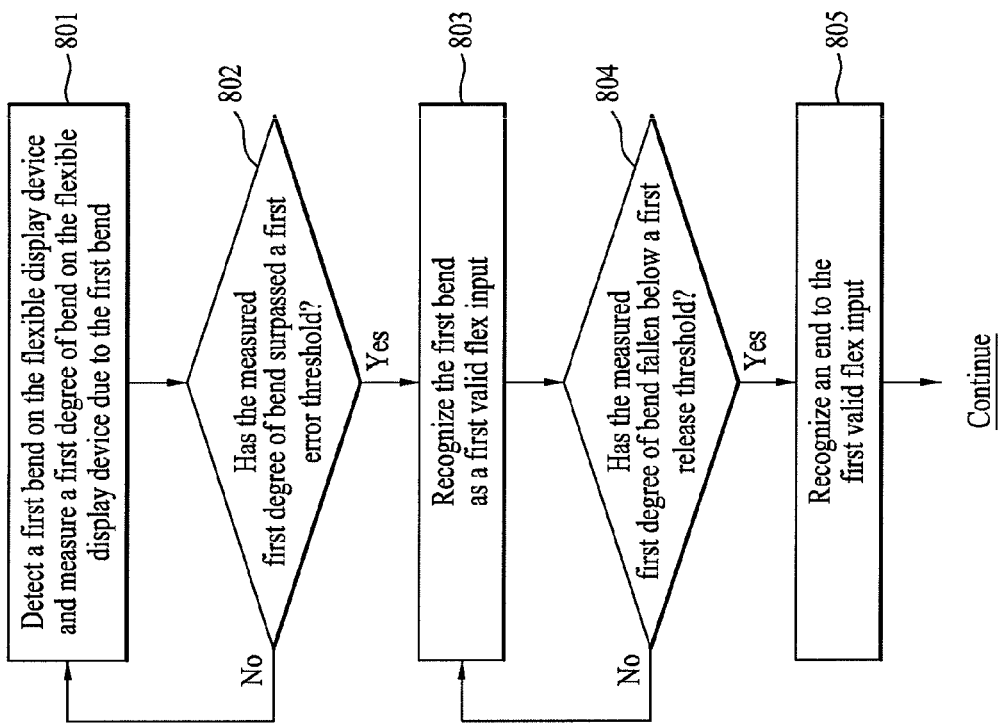
FIG. 8A illustrates a flowchart describing the steps of recognizing a beginning and end to a valid flex input, according to the present invention.

FIG. 8A is a flowchart describing the steps involved for recognizing a user's first flex input as a valid flex input according to the present invention. The recognition process begins with step 801 where a user first begins to bend a flexible display device and this bending is detected as a first bend on the flexible display device. Concurrent to the detection of the first bend, step 801 indicates that a first degree of bend on the flexible display device due to the first bend will be measured.

Then at step 802 a determination is made as to whether the measured first degree of bend surpasses a first error threshold value. If the measured first degree of bend surpasses the first error threshold value, then the first bend will begin to be recognized as a first valid flex input and a timer may begin to count the time for which the first valid flex input is recognized. The first degree of bend will also continue to be measured.

However, if the determination at step 802 finds that the measured first degree of bend does not yet surpass the first error threshold value, then the first bend will not yet be recognized as a first valid flex input. Instead, it may be assumed that the user's first bend will continue to increase the bending on the flexible display device, and consequently the first degree of bend will continue to be measured.

Following the recognition of the first bend as the valid first flex input at step 803, at step 804 a determination will be made as to whether the measured first degree of bend has fallen below a first release threshold value. If the measured first degree of bend has fallen below the first release threshold value, then the process proceeds to step 805 where an end to the first valid flex input is recognized.

However if the measured first degree of bend has not yet fallen below the first release threshold value, an end to the first valid flex input is not yet recognized. Instead, the process returns to step 803 where the flexible display device will continue to recognize the first valid flex input and continue to count the time of the first valid flex input.

Following the recognized end of the first valid flex input, the flexible display device may implement a function or operation on the flexible display device that corresponds to the recognized first valid flex input command. However, if a user beings to initiate a second bend on the flexible display device, a double flex input may be intended by the user. Therefore the process will continue to a second set of steps for determining whether to recognize a valid double flex input.

FIG. 8B illustrates a flowchart of steps that describe a method for recognizing a valid double flex input according to some embodiments of the present invention. Following the recognized end to the valid first flex input at step 805, a user may initiate a second bend which is detected at step 806. Also in step 806, a second degree of bend on the flexible display device due to the detected second bend will begin to be measured.

Then at step 807 a determination will be made as to whether the measured second degree of bend surpasses a second error threshold value. If the measured second degree of bend does surpass the second error threshold value, the second bend will be recognized as the start of a second valid flex input at step 808.

However if the measured second degree of bend does not yet surpass the second error threshold value, then the process returns to measuring the second degree of bend on the flexible display device due to the second bend at step 806.

Now assuming that the second bend has been recognized as a second valid flex input at step 808, the process proceeds to step 809 where a determination is made as to whether the second valid flex input was recognized within a predetermined amount of time from the end of the first valid flex input. If it is determined that the second valid flex input began to be recognized as a valid flex input within the predetermined amount of time following the end of the first valid flex input, then a valid double flex input is recognized as depicted by step 810. In this case as illustrated in FIG. 6, the time in-between the end of the first valid flex input and the start of the second valid flex input being recognized is the time from $t_3$ and $t_5$.

However if it is determined that the second valid flex input was not initially recognized as a valid flex input within the predetermined amount of time following the end of the first valid flex input, then a valid double flex input is not to be recognized. Instead, step 811 indicates that the second valid flex input is to be recognized as a separate valid flex input.

So for the method described by the flowchart of FIG. 8B, the flexible display device will measure the time between the recognized end of a first valid flex input and the recognized beginning of a second valid flex input. Then if the time between the recognized end of a first valid flex input and the recognized beginning of a second valid flex input is less than a predetermined amount of time, a valid double flex input will be recognized.

FIG. 8C illustrates a flowchart depicting steps for an alternative method of recognizing a valid double flex input according to some embodiments of the present invention. Following the recognized end to the valid first flex input at step 805, a user may initiate a second bend which is detected at step 806'. Also in step 806', a second degree of bend on the flexible display device due to the detected second bend will begin to be measured.

Then at step 807' a determination will be made as to whether the measured second degree of bend surpasses a second error threshold value. If the measured second degree of bend does surpass the second error threshold value, the second bend will be recognized as a second valid flex input at step 808'.

However if the measured second degree of bend does not yet surpass the second error threshold, then the process returns to measuring the second degree of bend on the flexible display device due to the second bend at step 806'.

Now assuming that the second bend is recognized as a second valid flex input at step 808', the process proceeds to step 809'. At step 809' a determination is made as to whether the measured second degree of bend has fallen below a second release threshold value. If the measured second degree of bend has indeed fallen below the second release threshold value, then an end to the second valid flex input is recognized as indicated by step 810'.

However, if the measured second degree of bend has not fallen below the second release threshold value, then the process returns to step 808' where the recognized second valid flex input continues to be recognized and the second degree of bend continues to be measured.

Now assuming that the end of the second valid flex input has been recognized at step 810', the process will proceed to step 811' where a determination is made as to whether the end of the second valid flex input was recognized within a predetermined amount of time from the end of the first valid flex input. If the end of the second valid flex input is determined to have been recognized within the predetermined amount of time following the recognized end of the first valid flex input, then a valid double flex input may be recognized as represented by step 812'. In this case as illustrated in FIG. 6, the time in-between the end of the first valid flex input and the end of the second valid flex input being recognized is the time from $t_3$ and $t_7$.

However if the end of the second valid flex input is determined to not have been recognized within the predetermined amount of time following the recognized end of the first valid flex input, then a valid double flex input may not be recognized as represented by step 813'. Instead, step 813 indicates that when the end of the second valid flex input is determined to have not been recognized within the predetermined amount of time following the recognized end of the first valid flex input, the second bend is simply recognized to be a second valid flex input that follows the first valid flex input.

It will be apparent to those skilled in the art that various modifications and variations can be made in the present invention. Thus, although the foregoing description has been described with reference to specific examples and embodiments, these are not intended to be exhaustive or to limit the invention to only those examples and embodiments specifically described.

What is claimed is:

1. A flexible display device, the flexible display device having at least one flexible portion, comprising:
   a display unit configured to display visual information;
   a sensing unit configured to measure a degree of bend; and
   a system controller configured to recognize a first bend as a first valid flex input when a first degree of bend surpasses a first error threshold value, to recognize an end of the first valid flex input when the first degree of bend falls below a first release threshold value, and to control the display unit to display a visual cue which is adaptively modified in response to the degree of bend,
   wherein a maximum degree of bend measured during the first bend is recognized as a first peak value,
   wherein the first error threshold value is determined based on a degree before the flexible display is bent and the first release threshold value is determined based on the first peak value, and
   wherein the first release threshold value is greater than the first error threshold value.

2. The flexible display device of claim 1, wherein the first error threshold value is determined by adding a predetermined number of units to the degree before the flexible display is bent.

3. The flexible display device of claim 1, wherein the first release threshold value is determined by decreasing a predetermined number of units from the first peak value.

4. The flexible display device of claim 1, wherein the first release threshold value is equal to a predetermined number of units less than the first peak value.

5. The flexible display device of claim 1, wherein the first release threshold value is equal to a percentage of the first peak value.

6. The flexible display device of claim 1, wherein:
   the sensing unit is further configured to measure a second degree of bend due to a second bend, the second bend following the end of the first valid flex input, and
   the system controller is further configured to recognize the second bend as a second valid flex input when the second degree of bend surpasses a second error threshold value, and recognize an end of the second valid flex input when the second degree of bend falls below a second release threshold value.

7. The flexible display device of claim 6, wherein a valid double flex input is recognized when the second valid flex input is recognized within a predetermined time following the first valid flex input or when the second valid flex input ends within a predetermined time following the first valid flex input.

8. The flexible display device of claim 7, wherein the recognition of the valid double flex input is predetermined to execute a specific function of the flexible display device.

9. The flexible display device of claim 6, wherein the second error threshold value is determined based on a degree at a point where the second bend begins.

10. The flexible display device of claim 9, wherein the second error threshold value is determined by adding a predetermined number of units to the degree at a point where the second bend begins.

11. The flexible display device of claim 6, wherein the maximum degree of bend measured during the second bend is recognized as a second peak value.

12. The flexible display device of claim 6, wherein the second release threshold value is determined based on the second peak value.

13. The flexible display device of claim 12, wherein the second release threshold value is determined by decreasing a predetermined number of units from the second peak value.

14. The flexible display device of claim 6, wherein the first bend and the second bend are in a same direction.

15. A method for detecting a bend on a flexible display device having at least one flexible portion, the method comprising:
   measuring a first degree of bend due to a first bend;
   recognizing the first bend as a first valid flex input when the first degree of bend surpasses a first error threshold value;
   recognizing an end of the first valid flex input when the first degree of bend falls below a first release threshold value; and
   controlling to display a visual cue which is adaptively modified in response to a degree of bend,
   wherein a maximum degree of bend measured during the first bend is recognized as a first peak value,
   wherein the first error threshold value is determined based on a degree before the flexible display is bent and the first release threshold value is determined based on the first peak value, and
   wherein the first release threshold value is greater than the first error threshold value.

16. The method of claim 15, wherein the first error threshold value is determined by adding a predetermined number of units to the degree before the flexible display is bent.

17. The method of claim 15, wherein the first release threshold value is determined by decreasing a predetermined number of units from the first peak value.

18. The method of claim 15, wherein the first release threshold value is equal to a predetermined number of units less than the first peak value.

19. The method of claim 15, wherein the first release threshold value is equal to a percentage of the first peak value.

20. The method of claim 15, further comprising:
   measuring a second degree of bend due to a second bend, the second bend following the end of the first valid flex input; and
   recognizing the second bend as a second valid flex input when the second degree of bend surpasses a second error threshold value; and
   recognizing an end of the second valid flex input when the second degree of bend falls below a second release threshold value.

21. The method of claim 20, wherein a valid double flex input is recognized when the second valid flex input is recognized within a predetermined time following the first valid flex input or when the second valid flex input ends within a predetermined time following the first valid flex input.

22. The method of claim 21, wherein the recognition of the valid double flex input is predetermined to execute a specific function of the flexible display device.

23. The method of claim 20, wherein the second error threshold value is determined based on a degree at a point where the second bend begins.

24. The method of claim 23, wherein the second error threshold value is determined by adding a predetermined number of units to the degree at a point where the second bend begins.

25. The method of claim 20, wherein the maximum degree of bend measured during the second bend is recognized as a second peak value.

26. The method of claim 20, wherein the second release threshold value is determined based on the second peak value.

27. The method of claim 26, wherein the second release threshold value is determined by decreasing a predetermined number of units from the second peak value.

28. The method of claim 20, wherein the first bend and the second bend are in a same direction.

* * * * *